United States Patent [19]

Ragas et al.

[11] 4,331,719

[45] May 25, 1982

[54] LOW TEMPERATURE CURING THERMOSETTING COATINGS FOR SOLVENT-SENSITIVE MOLDINGS

[75] Inventors: Frank J. Ragas, Willow Springs; Ralph L. Minnis, Des Plaines; Edward J. Murphy, Mt. Prospect, all of Ill.; Steve J. Vargo, Brighton, Mich.

[73] Assignee: DeSoto, Inc., Des Plaines, Ill.

[21] Appl. No.: 219,843

[22] Filed: Dec. 23, 1980

[51] Int. Cl.$^3$ ............................................. B05D 3/02
[52] U.S. Cl. .................................. 427/393.5; 428/516; 525/344; 524/376; 524/379; 524/533
[58] Field of Search .................. 526/312, 234, 320; 260/33.4 R; 525/344; 427/393.5; 428/516

[56] References Cited

U.S. PATENT DOCUMENTS 3,168,403 2/1965 Himmelmann et al. ............ 525/344
3,551,525 12/1970 Wilhelm et al. .................... 526/320
3,812,067 5/1974 Katsimbas et al. ................. 526/320

*Primary Examiner*—Joseph L. Schofer
*Assistant Examiner*—N. Sarofim
*Attorney, Agent, or Firm*—Dressler, Goldsmith, Shore, Sutker & Milnamow, Ltd.

[57] ABSTRACT

A low temperature curing solution coating composition is disclosed for the protection of solvent-sensitive thermoplastic moldings. In these compositions, a solvent medium consisting essentially of alcoholic solvents has dissolved therein a self-curing solution copolymer of monoethylenically unsaturated monomers containing an ether of an N-methylol functional monomer, especially isobutoxymethyl acrylamide. This solution is catalyzed with from 0.5% to 2.0%, based on the weight of the copolymer, of sulfuric acid. The catalyzed compositions are stable and cure at 150° F. to 200° F. without damaging the thermoplastic moldings.

11 Claims, No Drawings

LOW TEMPERATURE CURING THERMOSETTING COATINGS FOR SOLVENT-SENSITIVE MOLDINGS

DESCRIPTION

1. Technical Field

This invention relates to thermosetting solution coating compositions which cure at low temperatures and which can be applied and cured upon moldings made of solvent-sensitive plastics without damaging the molding so as to apply to such moldings coatings which are resistant to organic solvents and more resistant to abrasion.

2. Background Art

Molded plastics are frequently made of thermoplastic materials which are damaged by solvent attack. Polystyrene typifies such plastics. It is inexpensive, and particularly when it is made in the presence of a small amount of an elastomer, it has reasonably good impact resistance. Being thermoplastic, it is easily molded into desired shape. However, the final product is still sensitive to organic solvents, and it is sometimes desired to improve its abrasion resistance or to apply a decorative overcoat. The solvent sensitivity of the molding makes it very difficult to apply a coating to the molding, especially when heat must be used to cure the coating which is applied in order that the coated product will be more resistant to solvent attack or to abrasion, or to render it better able to accept subsequent coatings which would normally damage the molding if it were unprotected.

Thermosetting coating are commonly available, but these are either based on solvents which attack the molding which it is desired to protect, or they require temperatures of about 200° F. or higher for cure, or both, and hence cannot be used to provide the protection which is desired.

DISCLOSURE OF INVENTION

In accordance with this invention, a low temperature curing solution coating composition adapted to be applied to solvent-sensitive thermoplastic moldings and cured at an elevated temperature without damaging the moldings is provided by using a solvent medium consisting of alcoholic solvents, this solvent medium having dissolved therein a self-curing solution copolymer of monoethylenically unsaturated monomers comprising nonreactive monomer and from 5% to 30% of the weight of the copolymer of an ether of an N-methylol functional monomer. This solution of copolymer in alcoholic solvent medium is catalyzed with from 0.5% to 2.0%, based on the weight of the copolymer, of sulfuric acid. This copolymer solution does not attack ordinary thermoplastic moldings, and it cures rapidly at temperatures in the range of 150° F. to 200° F. At these temperatures the cure is so rapid and the alcoholic solvent medium has so little effect on the thermoplastic surface of the molding that a solvent-resistant and abrasion-resistant coating is formed without damaging the molding. Moreover, and despite the rapidity of the low temperature cure, the coating compositions are stable and can be stored after they have been catalyzed.

While any ether group will provide some protection for the N-methylol functional monomer, $C_2$–$C_8$ alkyl ethers are particularly contemplated, especially a butyl ether which provides a combination of insensitivity to sulfuric acid and volatility on baking which is superior. The isobutyl ether is particularly preferred.

While N-methylol amides are preferred, like N-methylol acrylamide and N-methylol methacrylamide, other monoethylenically unsaturated N-methylol functional monomers may be used, like N-methylol allyl carbamate. These are used in ether form. N-methylol acrylamide is particularly preferred, especially as isobutoxymethyl acrylamide.

The N-methylol functional monomer is preferably used in an amount of from 7% to 20% of the weight of the copolymer, and it can be used alone to provide cure by reaction with itself, or another monomer having a functional group provides active hydrogen atoms for reaction with the N-methylol monomer can be used in combination therewith. A lesser proportion of the N-methylol functional monomer can be used when another monomer reactive therewith is used.

The preferred monomers coreactive with the N-methylol monomer are hydroxy functional monomers, especially hydroxy alkyl acrylates or methacrylates in which the alkyl group contains from 2–4 carbon atoms. 2-hydroxyethyl acrylate and 2-hydroxy propyl methacrylate are illustrative. Another coreactive monomer is acrylamide. Acrylic acid or methacrylic acid may also be present. These coreactive monomers may be present in an amount up to about 35%, and at least about 5% is desirably present when such monomers are used.

At least about 50% of the total monomer weight is constituted by monoethylenically unsaturated monomers having no reactive group other than the single ethylenic group which is consumed during the copolymerization. These are illustrated by styrene, vinyl toluene, methyl methacrylate, ethyl acrylate, butyl acrylate, butyl methacrylate, methyl acrylate, vinyl acetate, acrylonitrile and the like. These are usually used in admixture with one another to provide a balance of desired physical properties, as is well known.

The selection of sulfuric acid in the amounts specified is critical in this invention. The usual acidic catalyst for N-methylol functional cures is para toluene sulfonic acid, but it requires higher temperatures for cure, and at these temperatures the thermoplastic moldings are attacked and damaged. Even at the lower curing temperature, only essentially alcoholic solutions avoid damaging the thermoplastic surface which is contacted by the solution coatings of this invention.

The preferred proportion of sulfuric acid catalyst is from 0.7% to 1.5%. Proportions are significant in order to obtain the rapid cure which is needed.

As a practical matter, the catalyst must be mixed into the coating composition when it is made, and long before it is used. It is surprising to find that the sulfuric acid-catalyzed compositions of this invention will cure so rapidly at low temperature, but are nonetheless stable for long periods of time on storage.

Baking conditions in this invention will range from 150° F. to 200° F. for periods of time ranging from about 10 minutes to an hour. A typical curing schedule is 30 minutes at 170° F.

The alcoholic solvents which are used are illustrated by ethyl alcohol, normal or isopropanol, n-butanol, isobutanol, 2-ethoxy ethanol and 2-butoxy ethanol. It is preferred that the alcohols contain up to a total of 4 carbon atoms. Butanols, propanols and 2-ethoxy ethanol are particularly effective to provide good solubility for the solution polymerization and poor solubility for the thermoplastic moldings to be coated at low curing temperatures which are contemplated. The presence of nonalcoholic solvents should be minimized, though small amounts of other solvents can be present without damage.

The thermoplastic moldings to be coated are typified by polystyrene and elastomer-strengthened polystyrene, as previously noted. Othe thermoplastics which are desirably coated in this invention are polycarbonates and high impact ABS resins.

The polymerization in solution is a conventional one, the polymerization taking place at moderate temperature (70° C.–90° C.) in relatively concentrated alcoholic solvent medium (50%–75%, preferably 60%–70%) in the presence of a free radical generating catalyst.

BEST MODE FOR CARRYING OUT THE INVENTION

Example 3036 grams of 2-ethoxy ethanol, 1564 grams of n-butanol and 20% of a catalyzed monomer mixture are heated in a reactor to 80–85° C. to initiate polymerization. The catalyzed monomer mixture is separately prepared as follows:

| grams | component |
|---|---|
| 5014 | methyl methacrylate |
| 2162 | 2-ethyl hexyl acrylate |
| 920 | isobutoxymethyl acrylamide |
| 1104 | 2-hydroxy propyl methacrylamide |
| 184 | azobisisobutyronitrile catalyst |

The remaining 80% of the above monomer mixture is added slowly to the reactor over a period of 3 hours while maintaining the temperature in the range of 80–85° C. Then, 18.4 grams of additional catalyst in 276 grams of 2-ethoxy ethanol are added and the reaction continued for 2 more hours. The product is then cooled and diluted to 50.1% resin solids content (Gardner-HOldt voscosity of $Z_2$). Sulfuric acid is then added and mixed in at 1% by weight based on the resin solids of the solution.

This coating composition can be pigmented or not, as desired, and it can be applied in any desired fashion, spray and dip application being presently preferred.

The clear coating solution described above is diluted with n-butanol to 30% solids and applied by dipping the molding in the solution. This applies a film between 0.5 and 1.0 mil in thickness which cures by baking in an oven at 170° F. in 20 minutes. The cured coating resists 90 double rubs with a methyl ethyl ketone-saturated cloth and it also resists abrasion. A small amount of butyl acetate can be tolerated in the above solution.

What is claimed is:

1. A low temperature curing solution coating composition adapted to be applied to solvent-sensitive thermoplastic moldings and cured at an elevated temperature without damaging said moldings comprising, a solvent medium consisting essentially of alcoholic solvents, said solvent medium having dissolved therein a self-curing solution copolymer of monoethylenically unsaturated monomers comprising nonreactive monomer and from 5% to 30% of the weight of the copolymer of an ether of an N-methylol functional monomer, said solution of copolymer in alcoholic solvent medium being catalyzed with from 0.5% to 2.0%, based on the weight of the copolymer, of sulfuric acid.

2. A coating composition as recited in claim 1 in which said ether is a butyl ether.

3. A coating composition as recited in claim 1 in which said monoethylenically unsaturated monomers include from 5% to 35% of an hydroxy alkyl acrylate or methacrylate in which the alkyl group contains from 2–4 carbon atoms.

4. A coating composition as recited in claim 3 in which said hydroxy alkyl acrylate or methacrylate is hydroxy propyl methacrylate.

5. A coating composition as recited in any one of claims 2–4 in which isobutoxymethyl acrylamide is present in an amount of from 7% to 20% of the weight of the copolymer.

6. A coating composition as recited in claim 5 in which said sulfuric acid is present in an amount of from 0.7% to 1.5%.

7. A coating composition as recited in claim 1 in which said N-methylol ether is a $C_2$–$C_8$ alkyl ether of acrylamide or methacrylamide and is present in an amount of 7% to 20% and said sulfuric acid is present in an amount of from 0.7% to 1.5%.

8. A coating composition as recited in claim 1 in which said alcoholic solvents are selected from butanols, propanols, 2-ethoxy ethanol, and mixtures thereof.

9. A low temperature curing solution coating composition adapted to be applied to solvent-sensitive thermoplastic moldings and cured at an elevated temperature without damaging said moldings comprising, a solvent medium consisting essentially of alcoholic solvents consisting essentially of alcoholic solvents selected from butanol, propanols, 2-ethoxy ethanol, and mixtures thereof, said solvent medium having dissolved therein a self-curing solution copolymer of monoethylenically unsaturated monomers comprising from 5% to 30% of the weight of the copolymer of a butanol ether of N-methylol acrylamide, from 5% to 35% of an hydroxy alkyl acrylate or methacrylate in which the alkyl group contains from 2–4 carbon atoms, balance nonreactive monomer, said solution of copolymer in alcoholic solvent being catalyzed with from 0.7% to 1.5%, based on the weight of the copolymer, of sulfuric acid.

10. A method of protecting the surface of a solvent-sensitive thermoplastic molding comprising applying to said surface the solution coating composition of claim 1, and curing the deposited coating at a temperature in the range of 150° F. to 200° F.

11. A method as recited in claim 10 in which the thermoplastic molding is a polystyrene molding.

* * * * *